United States Patent
Kadlec et al.

(10) Patent No.: US 9,067,271 B2
(45) Date of Patent: Jun. 30, 2015

(54) DEVICES AND METHODS FOR INDICATING POWER ON A TORCH

(71) Applicant: ILLINOIS TOOL WORKS INC., Glenview, IL (US)

(72) Inventors: Mark Steven Kadlec, Shiocton, WI (US); Bradley William Hemmert, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 186 days.

(21) Appl. No.: 13/714,772

(22) Filed: Dec. 14, 2012

(65) Prior Publication Data

US 2014/0166629 A1    Jun. 19, 2014

(51) Int. Cl.

| B23K 10/00 | (2006.01) |
|---|---|
| B23K 9/095 | (2006.01) |
| B23K 9/10 | (2006.01) |
| B23K 9/28 | (2006.01) |
| B23K 10/02 | (2006.01) |

(52) U.S. Cl.
CPC .............. *B23K 9/095* (2013.01); *B23K 9/1087* (2013.01); *B23K 9/287* (2013.01); *B23K 10/02* (2013.01)

(58) Field of Classification Search
CPC ........ B23K 9/095; B23K 9/287; B23K 10/02; B23K 10/006; H05H 1/36
USPC ............. 219/121.54, 121.57, 121.39, 121.59, 219/121.45
See application file for complete search history.

(56) References Cited

U.S. PATENT DOCUMENTS

| 4,389,561 | A |   | 6/1983 | Weman et al. |
| 4,484,059 | A |   | 11/1984 | Lillquist |
| 5,571,431 | A |   | 11/1996 | Lantieri et al. |
| 6,130,407 | A |   | 10/2000 | Villafuerte |
| 6,315,186 | B1 | * | 11/2001 | Friedl et al. .................. 228/102 |
| 8,431,862 | B2 | * | 4/2013 | Kachline .................. 219/130.01 |
| 2007/0051711 | A1 |   | 3/2007 | Kachline |
| 2008/0149602 | A1 |   | 6/2008 | Lenzner et al. |
| 2008/0169277 | A1 |   | 7/2008 | Achtner et al. |
| 2008/0237201 | A1 | * | 10/2008 | Shipulski et al. ........ 219/121.48 |
| 2009/0298024 | A1 |   | 12/2009 | Batzler et al. |
| 2011/0220616 | A1 |   | 9/2011 | Mehn et al. |
| 2011/0220619 | A1 |   | 9/2011 | Mehn |
| 2012/0122062 | A1 |   | 5/2012 | Yang et al. |
| 2014/0113527 | A1 | * | 4/2014 | Lindsay et al. ................... 451/5 |

FOREIGN PATENT DOCUMENTS

WO     2010045676     4/2010

OTHER PUBLICATIONS

International Search Report for PCT applicaton No. PCT/US2013/069274 dated Apr. 30, 2014, 8 pgs.

* cited by examiner

*Primary Examiner* — Mark Paschall
(74) *Attorney, Agent, or Firm* — Fletcher Yoder P.C.

(57) ABSTRACT

Devices and methods for indicating power on a torch. In one example, a welding or plasma cutting torch includes an indicator coupled to the torch. The torch also includes control circuitry coupled to the indicator and configured to provide a first signal and a second signal to the indicator. The indicator is configured to receive the first signal when at least one of welding power and arc starting power from a power supply is available at the torch and to receive the second signal when the at least one of active welding power and the arc starting power from the power supply is not available at the torch.

20 Claims, 5 Drawing Sheets

DEVICES AND METHODS FOR INDICATING POWER ON A TORCH

BACKGROUND

The invention relates generally to welding and plasma cutting torches and, more particularly, to devices and methods for indicating power on a torch.

Welding is a process that has become increasingly prevalent in various industries and applications. Such processes may be automated in certain contexts, although a large number of applications continue to exist for manual welding operations. In both cases, such welding operations rely on a variety of types of equipment to ensure that the supply of welding consumables (e.g., wire, shielding gas, etc.) is provided to the weld in an appropriate amount at the desired time. For example, metal inert gas (MIG) welding typically relies on a wire feeder to enable a welding wire to reach a welding torch. The wire is continuously fed during welding to provide filler metal. A power source ensures that arc heating is available to melt the filler metal and the underlying base metal.

In welding applications, a welding power supply typically provides welding power and/or arc starting power for welding. The welding power and/or arc starting power is provided to the torch such that, when active, a welding arc may be formed by placing the torch in close proximity to a workpiece. To determine if welding power and/or arc starting power is currently available at the torch, the welding operator may look at information displayed on the welding power supply or another welding device. Unfortunately, the welding operator may not be close enough to the welding device to look at the welding device and/or it may not be possible for the welding operator to look at the welding device. Moreover, in plasma cutting applications, a plasma cutting operator may desire to know if power is available at the plasma cutting torch and, similar to the welding operator, may not be close enough to the plasma cutting power supply and/or it may not be possible for the plasma cutting operator to look at the plasma cutting power supply. Accordingly, there is a need in the field for methods and/or devices that provide an operator with power availability information from a welding or plasma cutting power supply.

BRIEF DESCRIPTION

In one embodiment, a welding or plasma cutting torch includes an indicator coupled to the torch. The torch also includes control circuitry coupled to the indicator and configured to provide a first signal and a second signal to the indicator. The indicator is configured to receive the first signal when at least one of welding power and arc starting power from a power supply is available at the torch and to receive the second signal when the at least one of the welding power and the arc starting power from the power supply is not available at the torch.

In another embodiment, a method for indicating that a welding torch is receiving at least one of active welding power and arc starting power from a welding power supply includes receiving a first signal at the welding torch while the welding torch is receiving the at least one of active welding power and the arc starting power. The method also includes receiving a second signal at the welding torch while the welding torch is not receiving the at least one of active welding power and the arc starting power. The first signal is configured to provide a first indication that the welding torch is receiving the at least one of active welding power and the arc starting power and the second signal is configured to provide a second indication that the welding torch is not receiving the at least one of active welding power and the arc starting power.

In another embodiment, a welding or plasma cutting torch includes an indicator configured to indicate when at least one of welding power and arc starting power is available at the torch.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
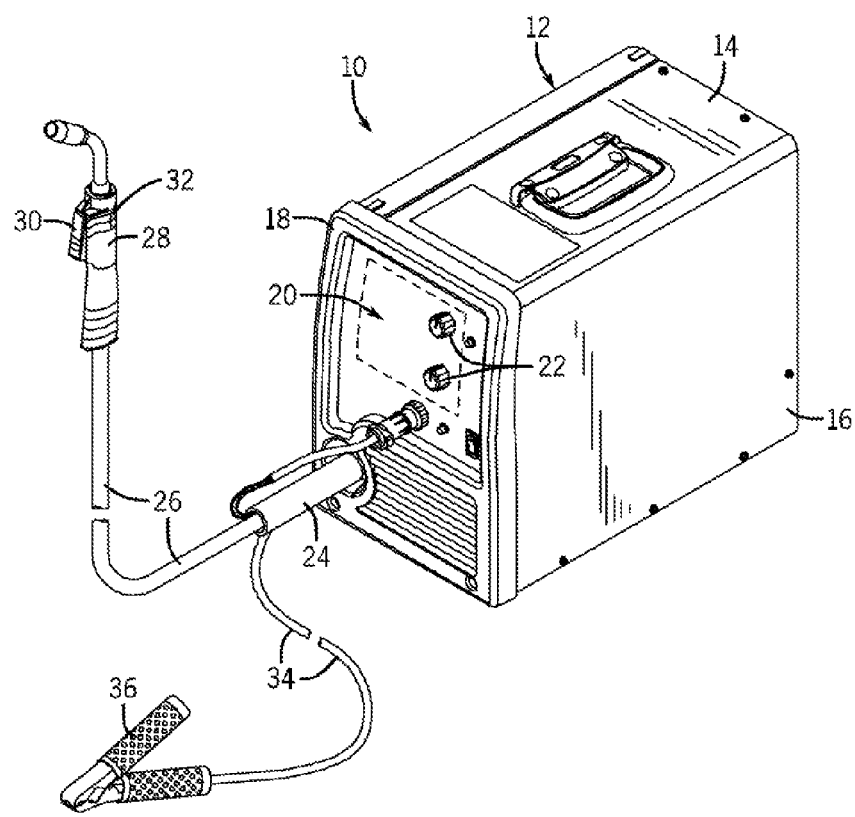
FIG. 1 is a perspective view of an embodiment of a welding power supply employing a welding torch with a power indicator.

Turning now to the drawings, FIG. 1 is a perspective view of an embodiment of a welding power supply 10 employing a welding torch with a power indicator. The welding power supply 10 includes a housing 12 having a top panel 14, a side panel 16, and a front panel 18. The top panel 14 may include a handle that facilitates transport of the welding power supply 10 from one location to another by an operator. The front panel 18 includes a control panel 20 adapted to allow an operator to set one or more parameters of the welding process, for example, via knobs 22 (or buttons, touchscreens, etc.). The control panel 20 may also include indicators that provide information to the operator (e.g., voltage, current, power availability, etc.).

In certain embodiments, the welding power supply 10 includes the functionality of a wire feeder (i.e., internal wire feeder). Such embodiments may include a wire drive configured to receive control signals to drive a wire spool. The wire drive feeds wire for the welding operation. In other embodiments, a separate wire feeder may be used in conjunction with the welding power supply 10 (i.e., external wire feeder). Such a separate wire feeder may also include a wire drive and a wire spool.

A main electrical connector 24 is coupled to the welding power supply 10 via the front panel 18. A cable 26 extends from the main connector 24 to a welding torch 28 configured to establish a welding arc during a welding operation. The welding torch 28 includes a trigger 30 that initiates a welding operation and causes welding wire to be supplied to the welding operation by exposing welding wire when pressed. Furthermore, pressing the trigger 30 may cause a switch in the trigger 30 to be actuated. In other embodiments, wire may be supplied to a welding operation using a spoolgun attached to a welding power supply. In such configurations, the spoolgun may include a trigger to supply welding wire.

The welding torch 28 includes an indicator 32 coupled to a body of the welding torch 28 and configured to indicate when welding power and/or arc starting power is available at the welding torch 28 (e.g., whether a welding arc may be formed while the trigger 30 is pressed). For example, the indicator 32 may indicate that welding power is available, that an arc starting power is available (e.g., a high frequency signal, a high voltage signal, a high current signal, etc.), and so forth. The indicator 32 may include any suitable type of indicator, such as an audio indicator, a visual indicator, a tactile indicator, and so forth. Moreover, the indicator 32 may include any suitable indicating device, such as a display, a screen, a light-emitting diode (LED), a light, a speaker, and/or a motor. For example, in certain embodiments, the indicator 32 may include a motor configured to provide tactile (e.g., vibration) feedback to the operator. In some embodiments, the indicator 32 may include a speaker configured to provide audible feedback (e.g., sounds) to the operator. Moreover, in other embodiments, the indicator 32 may include a display configured to provide visual (e.g., lights, pictures, illumination, flashing, etc.) feedback to the operator.

In certain embodiments, the indicator 32 may be configured to provide an indication when welding power and/or arc starting power is available at the welding torch 28. For example, in embodiments in which the indicator 32 is an LED, the LED may be on (e.g., illuminated) when welding power and/or arc starting power is available at the welding torch 28. Accordingly, if the LED is off (e.g., not illuminated), welding power and/or arc starting power is not available at the welding torch 28. In other embodiments, the indicator 32 may be configured to provide an indication when welding power and/or arc starting power is not available at the welding torch 28. For example, in embodiments in which the indicator 32 is an LED, the LED may be off when welding power and/or arc starting power is available at the welding torch 28. Accordingly, if the LED is on, welding power and/or arc starting power is not available at the welding torch 28. Alternatively, in certain embodiments, the welding torch 28 may include one or more LEDs to positively indicate both when welding power and/or arc starting power is available and when welding power and/or arc starting power is not available. For example, the LEDs may illuminate a first color (e.g., green) when welding power and/or arc starting power is available and illuminate a second color (e.g., red) when welding power and/or arc starting power is not available.

As may be appreciated, the indicator 32 may be configured to provide an indication in any suitable manner. Therefore, a welding operator using the welding torch 28 may receive an indication at the welding torch 28 that provides the welding operator with information about the availability of welding power and/or arc starting power at the welding torch 28. As may be appreciated, even though the welding torch 28 is illustrated, in other embodiment, a torch for plasma cutting, or a torch for another type of welding-type application, may include the indicator 32 for indicating that power is available at the torch.

A second cable 34 is attached to the welding power supply 10 through an aperture in the front panel 18 and terminates in a clamp 36 that is adapted to clamp to the workpiece during a welding operation to close the circuit between the welding power supply 10, the welding torch 28, and the workpiece. During such an operation, the welding power supply 10 is configured to receive primary power from a primary power supply, such as a power source (e.g., the power grid, engine-generator, etc.), to condition such incoming power, and to output a weld power output appropriate for use in the welding operation. Further, in certain embodiments, the welding power supply 10 may be configured to receive shielding gas, such as from a gas supply cylinder.

Figure 2:
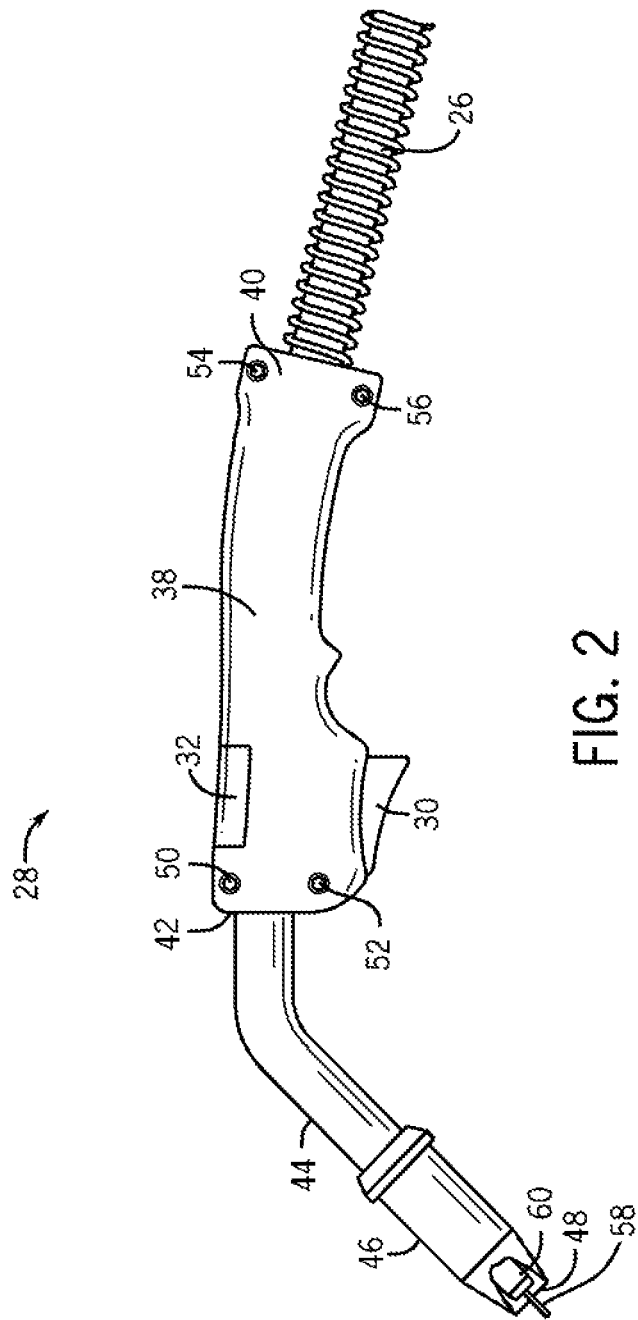
FIG. 2 is a side view of an embodiment of the welding torch of FIG. 1.

FIG. 2 is a side view of an embodiment of the welding torch 28 of FIG. 1. The welding torch 28 includes a handle 38 for a welding operator to hold while performing a weld. At a first end 40, the handle 38 is coupled to the cable 26 where welding consumables are supplied to the weld. Welding consumables generally travel through the handle 38 and exit at a second end 42 opposite from the first end 40. The welding torch 28 includes a neck 44 extending out of the end 42. As such, the neck 44 is coupled between the handle 38 and a nozzle 46. As should be noted, when the trigger 30 is pressed or actuated, welding wire travels through the cable 26, the handle 38, the neck 44, and the nozzle 46, so that the welding wire extends out of an end 48 (i.e., torch tip) of the nozzle 46.

As illustrated, the handle 38 is secured to the neck 44 via fasteners 50 and 52, and to the cable 26 via fasteners 54 and 56. The nozzle 46 is illustrated with a portion of the nozzle 46 removed to show welding wire 58 extending out of a guide or contact tip 60 (or other guiding device). The guide tip 60 is used to guide the welding wire 58 out of the end 48 of the welding torch 28. Although one type of welding torch 28 is illustrated, any suitable type of welding torch may include the indicator 32. For example, a welding torch having the indicator 32 may be configured for shielded metal arc welding (SMAW), gas tungsten arc welding (GTAW), gas metal arc welding (GMAW), and so forth.

Figure 3:
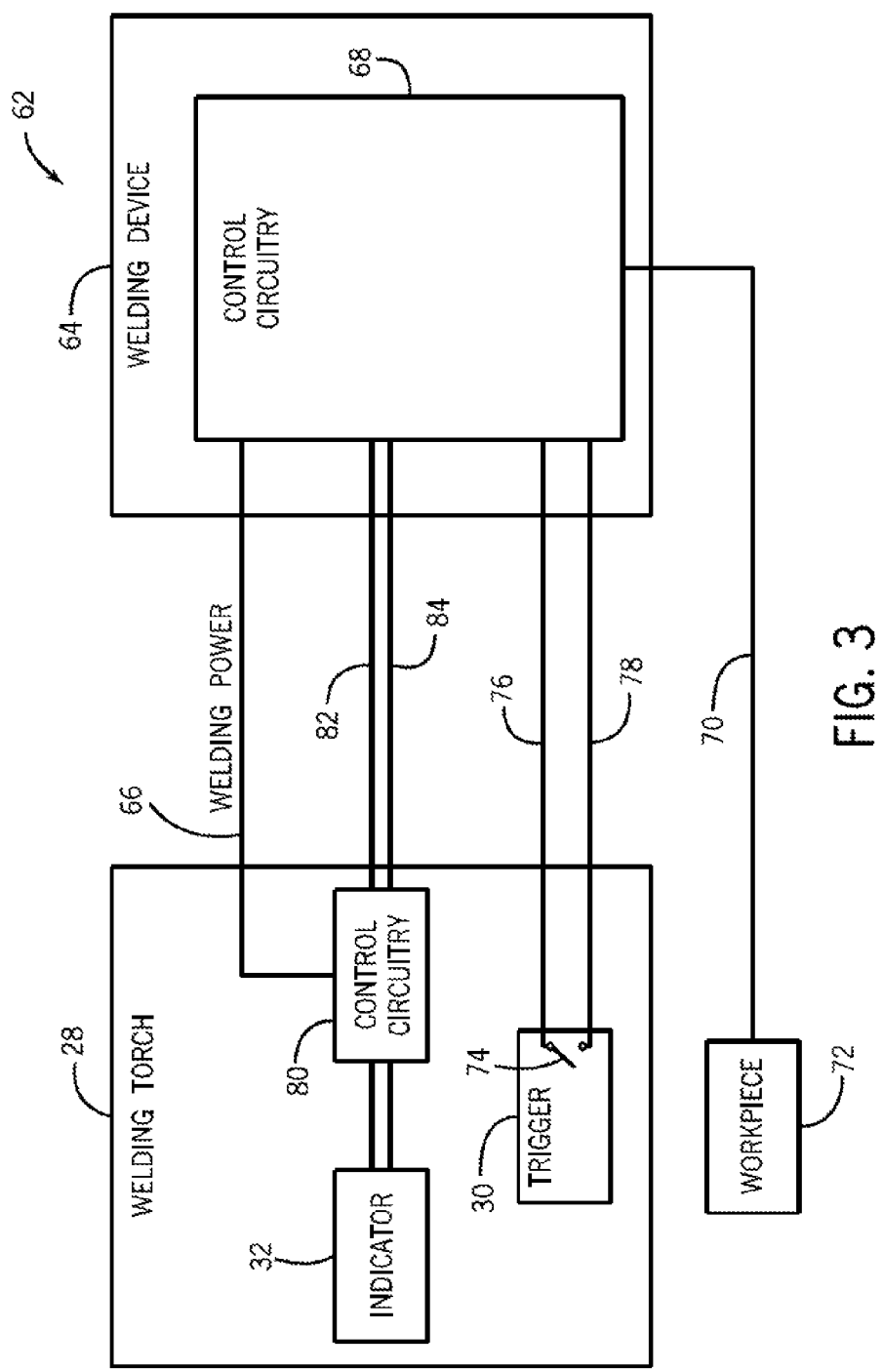
FIG. 3 is a schematic diagram of an embodiment of a welding system having a welding torch with a power indicator.

FIG. 3 is a schematic diagram of an embodiment of a welding system 62 having the welding torch 28 with the power indicator 32. The welding system 62 includes a welding device 64 (e.g., a welding power supply, a wire feeder, a pendant, etc.) configured to provide welding power to the welding torch 28 via a welding power conductor 66. Specifically, the welding device 64 (e.g., the welding power supply 10 of FIG. 1) includes control circuitry 68 configured to provide the welding power to the welding torch 28 and/or to condition the welding power provided to the welding torch 28. The control circuitry 68 is coupled to a conductor 70 which provides a conductive pathway between the control circuitry 68 and a workpiece 72 to facilitate current flow for a welding operation.

The trigger 30 of the welding torch 28 includes a switch 74 that switches between an open position and a closed position based on whether the trigger 30 is actuated. Conductors 76 and 78 are coupled between the switch 74 of the trigger 30 and the control circuitry 68 of the welding device 64. The switch 74 controls whether there is conductivity between the conductors 76 and 78. For example, when the switch 74 is open (e.g., the trigger 30 is not actuated or pressed) there is no conductivity between the conductors 76 and 78. In contrast, when the switch 74 is closed (e.g., the trigger 30 is actuated or pressed) there is conductivity between the conductors 76 and 78. As may be appreciated, the control circuitry 68 of the welding device 64 may be configured to detect whether the switch 74 is open or closed. Accordingly, the control circuitry 68 may be used to determine whether the trigger 30 is actuated or pressed.

The welding torch 28 includes control circuitry 80 coupled to the indicator 32 and configured to provide one or more signals to the indicator 32. In the illustrated embodiment, the conductors 82 and 84 are coupled between the control circuitry 68 of the welding device 64 and the control circuitry 80 of the welding torch 28. In certain embodiments, the control circuitry 80 may provide one or more signals to the indicator 32 based on a voltage difference between the conductors 82 and 84. For example, the control circuitry 80 may receive a first signal (e.g., voltage) based on a first voltage difference between the conductors 82 and 84. Moreover, the control circuitry 80 may receive a second signal (e.g., voltage) based on a second voltage difference between the conductors 82 and 84. In some embodiments, the first signal may indicate that welding power and/or arc starting power from the welding device 64 is available at the welding torch 28. Furthermore, the second signal may indicate that welding power and/or arc starting power from the welding device 64 is not available at the welding torch 28. The control circuitry 80 may provide the first and second signals to the indicator 32 to facilitate the indicator 32 providing information about the availability of power to the operator of the welding torch 28.

The control circuitry 68 of the welding device 64 may use various logical methods to determine when welding power is available at the welding torch 28. For example, the control circuitry 68 may indicate that welding power and/or arc starting power is available at the welding torch 28 only when the trigger 30 is actuated. Accordingly, if the switch 74 is open, the control circuitry 68 may indicate across conductors 82 and 84 that welding power and/or arc starting power is not available at the welding torch 28. Furthermore, if the switch 74 is closed and welding power and/or arc starting power is available across conductors 66 and 70, the control circuitry 68 may indicate across conductors 82 and 84 that welding power and/or arc starting power is available at the welding torch 28.

In certain embodiments, the control circuitry 68 of the welding device 64 and/or the control circuitry 80 of the welding torch 28 may have one or more monitors for detecting the availability of welding power and/or arc starting power. For example, the control circuitry 68 and/or the control circuitry 80 may have a voltage monitor, a current monitor, and so forth. In some embodiments, the control circuitry 68 and/or the control circuitry 80 may detect a voltage across the conductors 66 and 70 (e.g., while welding is not occurring). In other embodiments, the control circuitry 68 and/or the control circuitry 80 may detect a current between the conductors 66 and 70 (e.g., while welding is occurring). The presence of a voltage or a current across the conductors 66 and 70 may be used to indicate that welding power and/or arc starting power is available at the welding torch 28.

The control circuitry 80 of the welding torch 28 may be configured to power the indicator 32 and/or provide suitable signals to drive the indicator 32 to provide power indications to the welding operator. Accordingly, the welding operator may be able to determine whether power is available at the welding torch 28 simply by looking at the indicator 32 on the welding torch 28. As may be appreciated, the conductors 66, 70, 76, 78, 82, and 84 may be combined into a single cable and/or may be part of multiple cables. For example, in certain embodiments, the conductors 76, 78, 82, and 84 may be part of a control cable (e.g., 14-pin cable).

Figure 4:
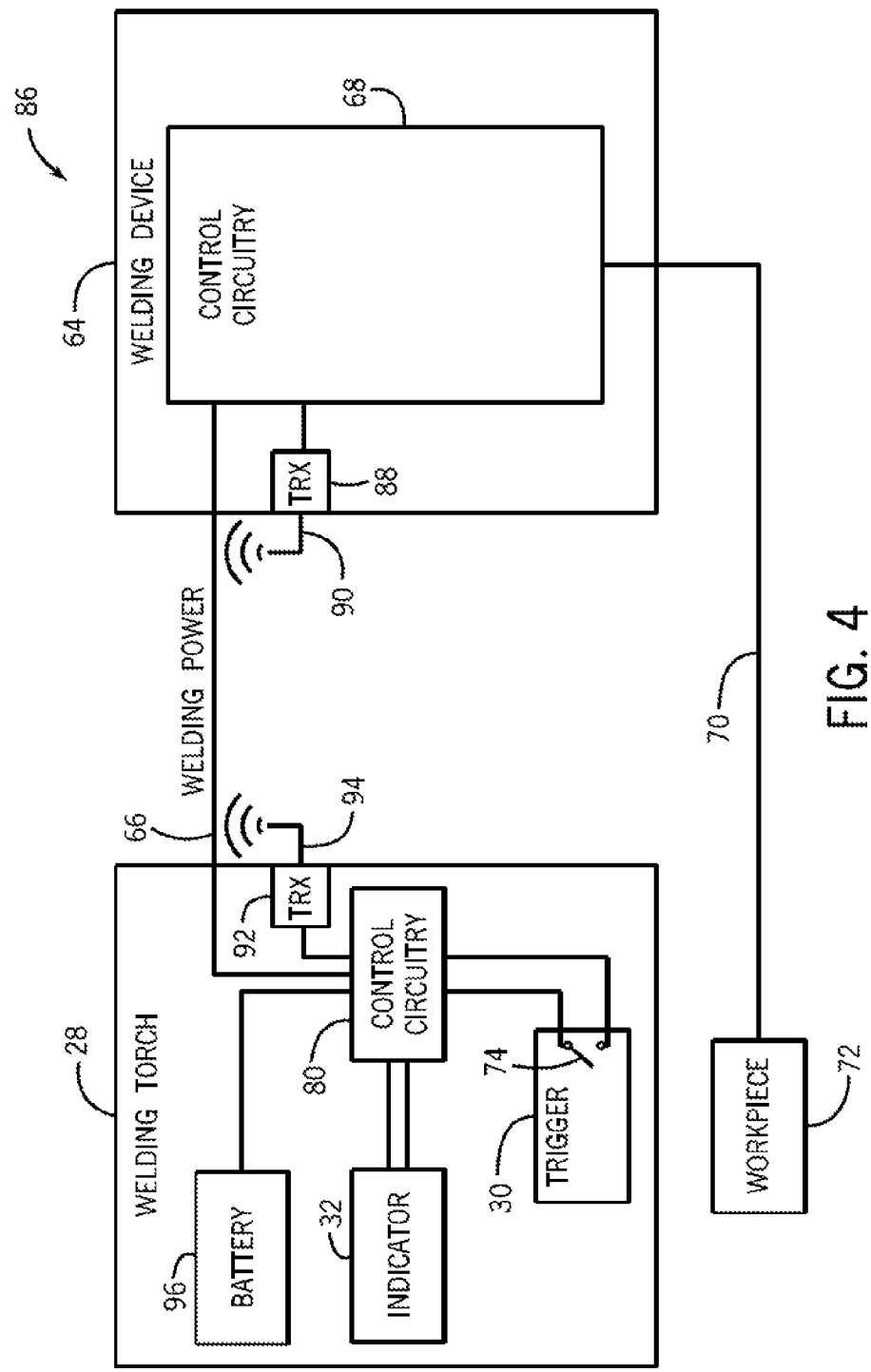
FIG. 4 is a schematic diagram of another embodiment of a welding system having a welding torch with a power indicator.

FIG. 4 is a schematic diagram of another embodiment of a welding system 86 having the welding torch 28 with the power indicator 32. In the illustrated embodiment, the welding device 64 includes a transceiver 88 configured to send and/or receive wireless signals 90. The transceiver 88 of the welding device 64 may be configured to communicate with a transceiver 92 of the welding torch 28 via wireless signals 94 sent to and/or received from the transceiver 92. Accordingly, the transceiver 92 of the welding torch 28 may receive signals from the transceiver 88 of the welding device 64. The received signals may indicate whether welding power and/or arc starting power is available at the welding torch 28. Furthermore, the transceiver 92 of the welding torch 28 may provide signals to the transceiver 88 of the welding device 64 indicating whether the switch 74 of the trigger 30 is open or closed. Moreover, a battery 96 is coupled to the control circuitry 80 to provide power to the control circuitry 80, the transceiver 92, and/or the indicator 32. In such a configuration, conductors 76, 78, 82, and 84 may not be included, thereby reducing the number of conductors that extend between the welding device 64 and the welding torch 28.

Figure 5:
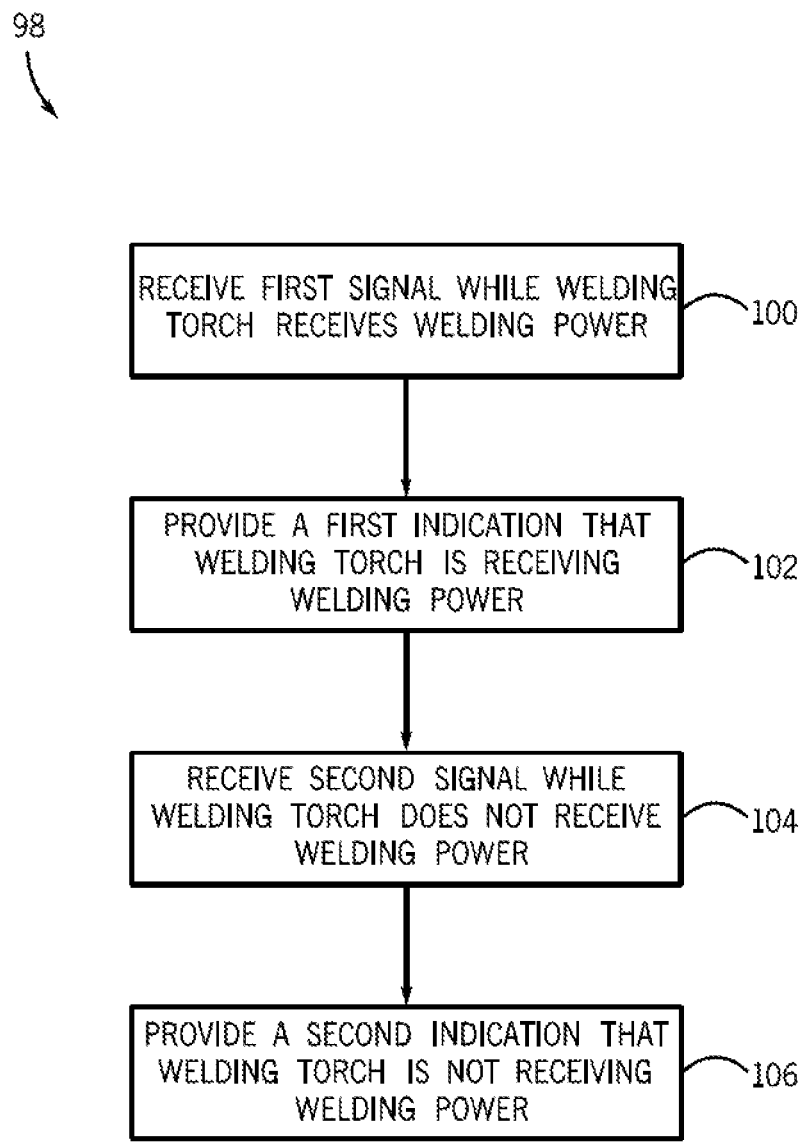
FIG. 5 is a flow chart of an embodiment of a method for indicating that a welding torch is receiving active welding power from a welding power supply.

FIG. 5 is a flow chart of an embodiment of a method 98 for indicating that the welding torch 28 is receiving active welding power and/or arc starting power from the welding power supply 10. In the method 98, the control circuitry 80 of the welding torch 28 receives a first signal while the welding torch 28 is receiving welding power and/or arc starting power (block 100). For example, the control circuitry 80 may receive a signal represented by a voltage difference between conductors 82 and 84. As another example, the control circuitry 80 may receive a digital signal wirelessly via the transceiver 92 indicating that the welding torch 28 is receiving welding power and/or arc starting power. The control circuitry 80 provides a first indication to the indicator 32 that the welding torch 28 is receiving welding power and/or arc starting power based on the first signal (block 102). For example, the control circuitry 80 may power an LED, provide image data to a display, remove power from an LED, remove image data from a display, provide audio data to a speaker, power a motor, remove power from a motor, and so forth, based on the first signal.

The control circuitry 80 of the welding torch 28 receives a second signal while the welding torch 28 is not receiving welding power and/or arc starting power (block 104). For example, the control circuitry 80 may receive a signal represented by a voltage difference between conductors 82 and 84. As another example, the control circuitry 80 may receive a digital signal wirelessly via the transceiver 92 indicating that the welding torch 28 is not receiving welding power and/or arc starting power. The control circuitry 80 provides a second indication to the indicator 32 that the welding torch 28 is not receiving welding power and/or arc starting power based on the second signal (block 106). For example, the control circuitry 80 may power an LED, provide image data to a display, remove power from an LED, remove image data from a display, provide audio data to a speaker, power a motor, remove power from a motor, and so forth, based on the second signal.

The devices and methods described herein may be used to provide an indication to a welding or plasma cutting operator that power is available at the torch. The indication is provided from the torch so that the operator may receive the indication regardless of their location (e.g., even when the operator is not close to the welding device that may be providing power). Moreover, the operator may receive the indication prior to and/or during the welding or plasma cutting operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding or plasma cutting torch, comprising:
   an indicator coupled to a body of the torch; and
   control circuitry coupled to the indicator and configured to provide a first signal and a second signal to the indicator;
   wherein the indicator is configured to receive the first signal when at least one of welding power and arc starting power from a power supply is available at the torch, the indicator is configured to receive the second signal when the at least one of the welding power and the arc starting power from the power supply is not available at the torch, the first signal comprises a voltage signal while welding or cutting is not occurring, and the first signal comprises a current signal while welding or cutting is occurring.

2. The torch of claim 1, wherein the indicator comprises a visual indicator.

3. The torch of claim 2, wherein the visual indicator comprises a light-emitting diode.

4. The torch of claim 2, wherein the visual indicator comprises a display.

5. The torch of claim 1, wherein the indicator comprises an audio indicator.

6. The torch of claim 1, wherein the control circuitry comprises a battery for providing power to the control circuitry and to the indicator.

7. The torch of claim 1, wherein the control circuitry comprises a wireless receiver for wirelessly communicating with the power supply.

8. The torch of claim 1, wherein the first signal comprises a first voltage and the second signal comprises a second voltage while welding or cutting is not occurring.

9. The torch of claim 1, wherein the first signal and the second signal are provided by a device in a welding system.

10. The torch of claim 1, comprising a torch trigger configured to be actuated during a welding or plasma cutting operation.

11. The torch of claim 10, wherein the indicator is configured to receive the first signal while the torch trigger is being actuated.

12. A method for indicating that a welding torch is receiving at least one of active welding power and arc starting power from a welding power supply, comprising:
receiving a first signal at the welding torch while the welding torch is receiving the at least one of the active welding power and the arc starting power;
providing a first indication that the welding torch is receiving the at least one of the active welding power and the arc starting power based at least partly on the first signal;
receiving a second signal at the welding torch while the welding torch is not receiving the at least one of the active welding power and the arc starting power; and
providing a second indication that the welding torch is not receiving the at least one of the active welding power and the arc starting power based at least partly on the second signal.

13. The method of claim 12, wherein receiving the first signal at the welding torch comprises receiving a first voltage at the welding torch, and receiving the second signal at the welding torch comprises receiving a second voltage at the welding torch.

14. The method of claim 12, wherein receiving the first signal at the welding torch and receiving the second signal at the welding torch each comprise receiving wireless data from a device in a welding system.

15. The method of claim 12, wherein providing the first indication that the welding torch is receiving the at least one of the active welding power and the arc starting power comprises powering a visual indicator, and providing the second indication that the welding torch is not receiving the at least one of the active welding power and the arc starting power comprises removing power from the visual indicator.

16. The method of claim 12, wherein providing the first indication that the welding torch is receiving the at least one of the active welding power and the arc starting power comprises providing a first image on a display of the welding torch, and providing the second indication that the welding torch is not receiving the at least one of the active welding power and the arc starting power comprises providing a second image on the display of the welding torch.

17. A welding or plasma cutting torch comprising:
an indicator configured to indicate when at least one of welding power and arc starting power is available at the torch; and
a battery configured to power the indicator.

18. The torch of claim 17, comprising a wireless receiver configured to receive an indication that the at least one of the welding power and the arc starting power is available at the torch.

19. The torch of claim 17, wherein the indicator comprises a light-emitting diode (LED) that is configured to be illuminated when the at least one of the welding power and the arc starting power is available at the torch.

20. The torch of claim 17, comprising control circuitry configured to detect availability of the at least one of welding power and arc starting power via detection of a signal across a first conductor coupled to the torch and a second conductor coupled to a workpiece.

* * * * *